(12) United States Patent
Naphade et al.

(10) Patent No.: US 11,250,468 B2
(45) Date of Patent: Feb. 15, 2022

(54) PROMPTING WEB-BASED USER INTERACTION

(71) Applicant: INTERNATIONAL BUSINESS MACHINES CORPORATION, Armonk, NY (US)

(72) Inventors: Deepti M. Naphade, Cupertino, CA (US); Heidi Lagares-Greenblatt, Jefferson Hills, PA (US); Yuk L. Chan, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 16/288,885

(22) Filed: Feb. 28, 2019

(65) Prior Publication Data

US 2020/0279289 A1    Sep. 3, 2020

(51) Int. Cl.
| | |
|---|---|
| *G06Q 30/00* | (2012.01) |
| *G06Q 30/02* | (2012.01) |
| *G06N 20/00* | (2019.01) |
| *H04N 21/442* | (2011.01) |
| *H04N 21/466* | (2011.01) |
| *G06Q 30/06* | (2012.01) |

(52) U.S. Cl.
CPC ......... *G06Q 30/0255* (2013.01); *G06N 20/00* (2019.01); *G06Q 30/0272* (2013.01); *G06Q 30/0643* (2013.01); *H04N 21/44218* (2013.01); *H04N 21/466* (2013.01)

(58) Field of Classification Search
CPC ........... G06Q 30/0255; G06Q 30/0272; G06Q 30/0643; G06N 20/00; H04N 21/44218; H04N 21/466

USPC ...................................................... 705/14.53
See application file for complete search history.

(56) References Cited

U.S. PATENT DOCUMENTS

| | | | |
|---|---|---|---|
| 8,887,197 | B2 | 11/2014 | Fengg |
| 8,965,828 | B2 | 2/2015 | Greenzeiger |
| (Continued) | | | |

FOREIGN PATENT DOCUMENTS

| | | |
|---|---|---|
| WO | 2012074813 A2 | 6/2012 |
| WO | 2013137512 A1 | 9/2013 |

OTHER PUBLICATIONS

Loiacono et al. "Online Mood Induction," Proceedings of the Eleventh Americas Conference on Information Systems (AMCIS), Worcester Polytechnic Institute Digital Commons @WPI. Aug. 1, 2005. 5 pages.

*Primary Examiner* — Sun M Li
(74) *Attorney, Agent, or Firm* — Cantor Colburn LLP; Teddi Maranzano

(57) ABSTRACT

Methods, systems and computer program products for prompting web-based user interaction are provided. Aspects include determining a plurality of items of interest based on data associated with a user. Aspects also include associating an emotion with each item of the plurality of items of interest. Aspects also include associating an emotion with each digital media clip of a plurality of digital media clips. Responsive to detecting an internet browsing action performed by the user, aspects include displaying a selected digital media clip of the plurality of digital media clips and a selected item of interest of the plurality of items of interest. The selected digital media clip and the selected item of interest are associated with a same emotion.

20 Claims, 6 Drawing Sheets

(56) References Cited

U.S. PATENT DOCUMENTS

| | | | |
|---|---|---|---|
| 2006/0143647 A1* | 6/2006 | Bill | G06F 16/683 |
| | | | 725/10 |
| 2012/0143693 A1* | 6/2012 | Chung | G06Q 30/0241 |
| | | | 705/14.66 |
| 2015/0067708 A1* | 3/2015 | Jensen | H04N 21/44218 |
| | | | 725/10 |
| 2015/0317680 A1 | 11/2015 | Richman et al. | |
| 2015/0331954 A1 | 11/2015 | Wickramasuriya et al. | |
| 2017/0105048 A1* | 4/2017 | Stein | G06F 3/0482 |
| 2017/0154356 A1* | 6/2017 | Trevisiol | G06Q 30/0272 |
| 2018/0192108 A1 | 7/2018 | Lyons et al. | |
| 2020/0160386 A1* | 5/2020 | Chan | G06Q 30/0255 |

\* cited by examiner

PROMPTING WEB-BASED USER INTERACTION

BACKGROUND

The present invention generally relates to internet browsing, and more specifically, to prompting web-based user interaction.

Promotors of online content strive to find ways to increase user engagement with products or other messages. For example, pop-up windows are a way of drawing attention to a product or message being promoted by a website. However, such methods of promoting content are often viewed as annoying or intrusive and may be lacking in terms of their ability to generate a high click-through rate. Other methods can involve more promoting content as intermingled results of search engine query or as banners in a margin of a browser, however, these methods may be too subtle to effectively generate a motivation in many users to interact with the content.

SUMMARY

Embodiments of the present invention are directed to a computer-implemented method for prompting web-based user interaction. A non-limiting example of the computer-implemented method includes determining a plurality of items of interest based on data associated with a user. The method also includes associating an emotion with each item of the plurality of items of interest. The method also includes associating an emotion with each digital media clip of a plurality of digital media clips. Responsive to detecting an internet browsing action performed by the user, the method includes displaying a selected digital media clip of the plurality of digital media clips and a selected item of interest of the plurality of items of interest. The selected digital media clip and the selected item of interest may be associated with a same emotion.

Embodiments of the present invention are directed to a system for prompting web-based user interaction. The system includes a memory having computer readable computer instructions, and a processor for executing the computer readable instructions. The computer readable instructions include instructions for determining a plurality of items of interest based on data associated with a user. The computer readable instructions also include instructions for associating an emotion with each item of the plurality of items of interest. The computer readable instructions also include instructions for associating an emotion with each digital media clip of a plurality of digital media clips. Responsive to detecting an internet browsing action performed by the user, the computer readable instructions include instructions for displaying a selected digital media clip of the plurality of digital media clips and a selected item of interest of the plurality of items of interest. The selected digital media clip and the selected item of interest may be associated with a same emotion.

Embodiments of the invention are directed to a computer program product for prompting web-based user interaction, the computer program product comprising a computer readable storage medium having program instructions embodied therewith. The computer readable storage medium is not a transitory signal per se. The program instructions are executable by a processor to cause the processor to perform a method. A non-limiting example of the method includes determining a plurality of items of interest based on data associated with a user. The method also includes associating an emotion with each item of the plurality of items of interest. The method also includes associating an emotion with each digital media clip of a plurality of digital media clips. Responsive to detecting an internet browsing action performed by the user, the method includes displaying a selected digital media clip of the plurality of digital media clips and a selected item of interest of the plurality of items of interest. The selected digital media clip and the selected item of interest may be associated with a same emotion.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
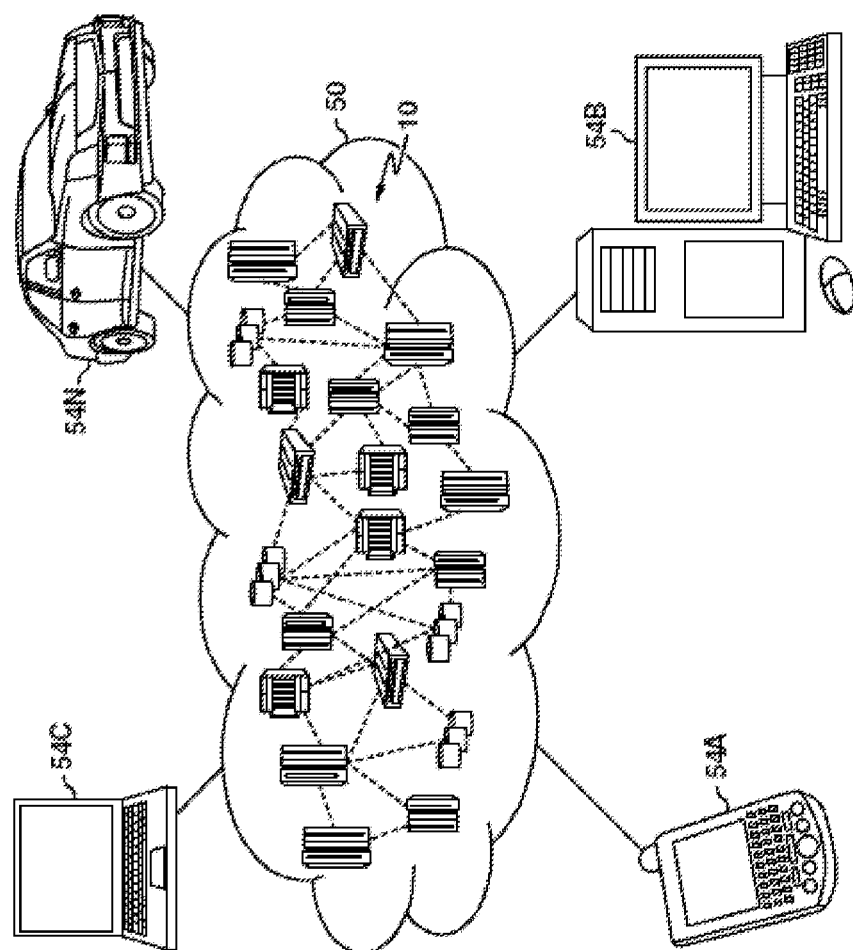
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
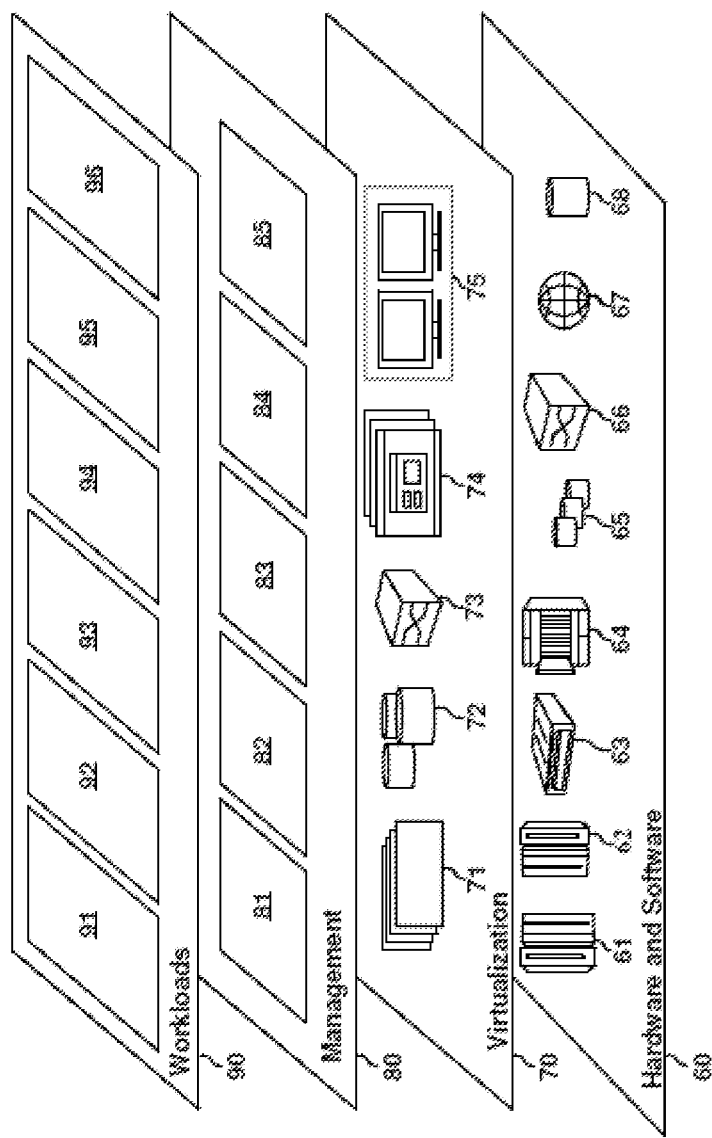
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prompting web-based user interaction 96.

Figure 3:
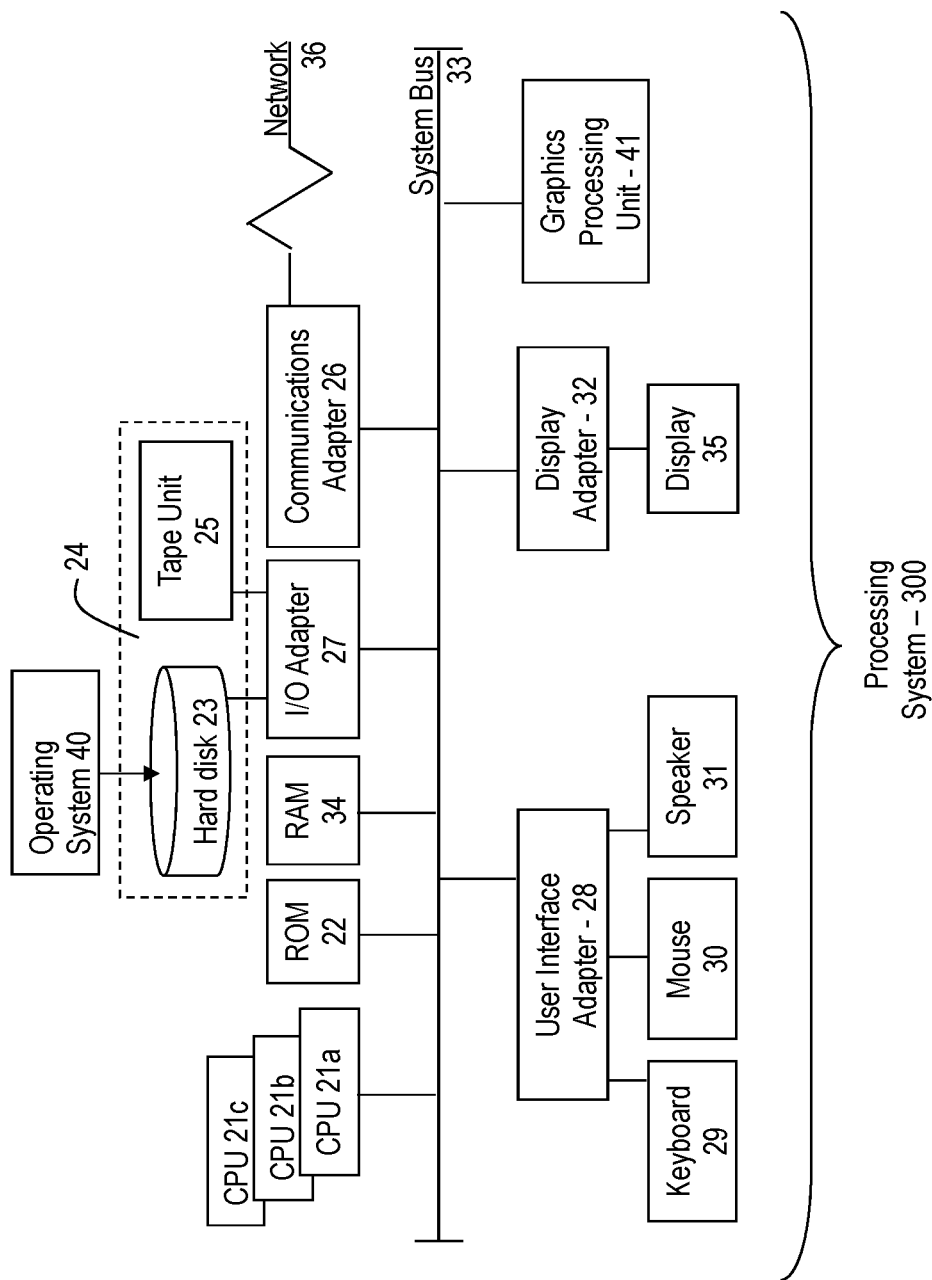
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for prompting web-based user interaction is provided. In exemplary embodiments, may identify items that a user may be interested in purchasing based on data associated with the user, such as browsing history, loyalty program information and buying patterns. For each such item of interest, the system may associate an emotion, feeling or desire with the item. For example, the system may associate compassion, caring, and love with items associated with a trip to visit relatives (e.g., plane tickets, hotel stay, etc.), whereas the system may associate aggression, energetic feelings, and/or health-consciousness with a piece of work out equipment that a user may be interested in purchasing. The system may receive or access a plurality of digital media clips, such as clips from movies, TV shows, songs or other such pop culture references and associate an emotion with each of the digital media clips. For example, the system may associate love or romance with a clip from a particular song, or aggression with a clip from an action movie. According to some embodiments, in response to a user's internet browsing activity, the system may cause a selected media clip and a selected item of interest that are associated with the same (or similar) emotion to be displayed to the user. For example, if the user is watching videos excerpts of sporting events, the system may display a clip of an action movie followed by an advertisement for a piece of fitness equipment the user may be interested in buying. In this way, the system may create a positive emotional association between the item of interest and the media clip that may be more likely to motivate a user to click on, for example, an advertisement for the item of interest.

According to some embodiments, the system may be configured to automatically modify the nature of the digital media clips, the emotional content, and/or the method of presentation of the social media clip (e.g., pop-up, embedded in search results, positioned in a margin of a browser, etc.) and item of interest to attempt to maximize a user's interactions with the items of interest based on the user's previous interactions. For example, the system may utilize machine learning techniques to learn what aspects are most likely to result in a user interaction with the presented content. Further, in some embodiments, prior to displaying a selected digital media clip and a selected item of interest, the system may be configured to determine an emotional state of the user and select a digital media clip and/or item of interest based on the determined emotional state of the user. In this way, embodiments of the invention can provide techniques for selecting and presenting items or other content to a user that in a manner that the user may be more engaged with by aligning with or complimenting a user's emotional state. Further, in some embodiments, the system can automatically learn (e.g., via machine learning techniques) which types of emotional stimulus and visual presentation styles of digital media a particular user finds to be the most engaging and can, therefore, select content and presentation styles that are designed to optimize user engagement.

Figure 4:
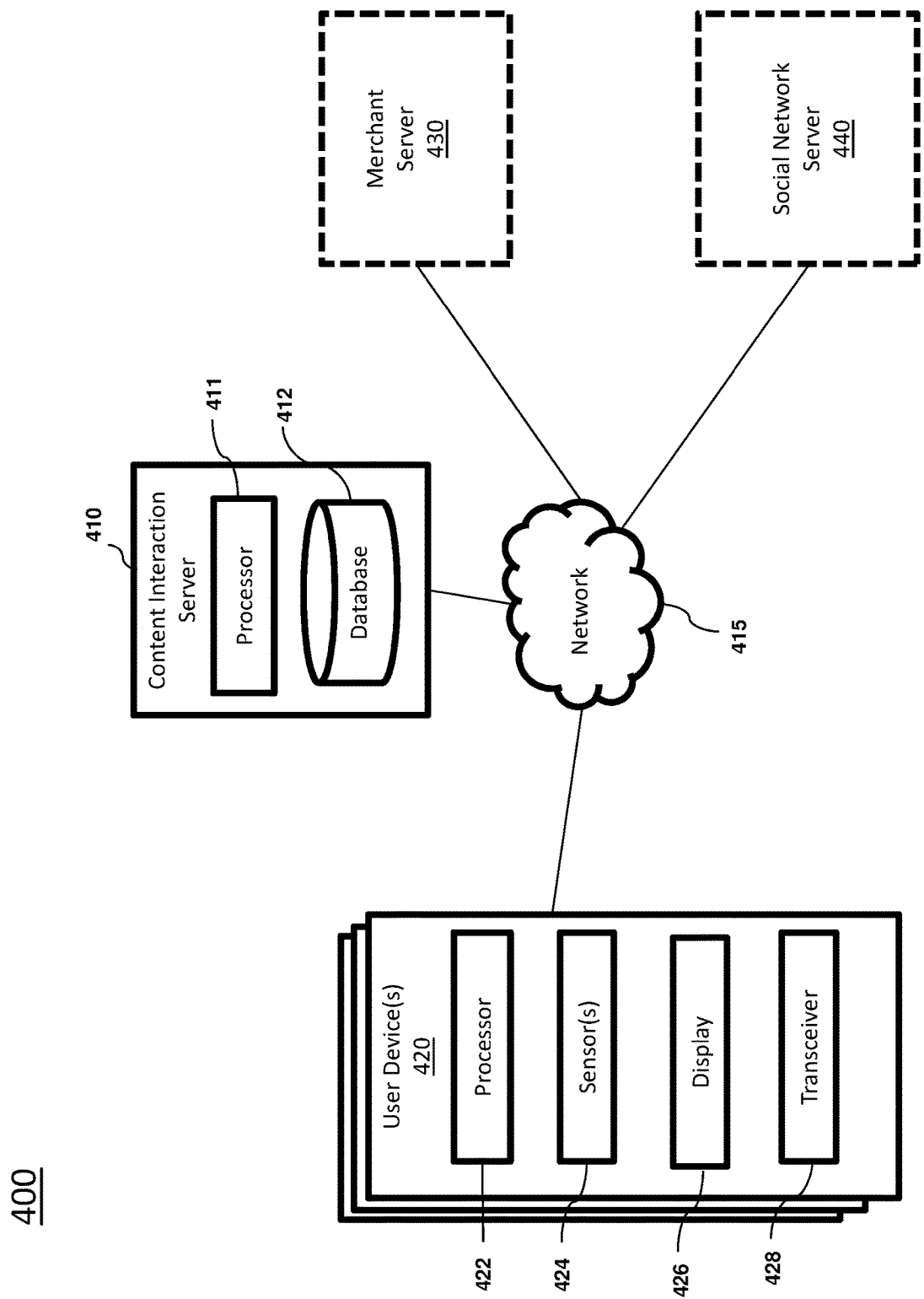
FIG. 4 depicts a system upon which prompting web-based user interaction may be implemented according to one or more embodiments of the present invention.

Turning now to FIG. 4, a system 400 for prompting web-based user interaction will now be described in accordance with an embodiment. The system 400 includes a content interaction server 410 in communication with user devices 420, a merchant server 430 and a social network server 440 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.).

In exemplary embodiments, a content interaction server 410 can include a processor 411 for executing the functionality described herein and a memory 412 for storing data used to perform such functionality. For example, memory 412 can store a plurality of digital media clips, information relating to a plurality of items of interest, user profiles and the like. Digital media clips can be, for example, short video clips of scenes from popular movies, TV shows, songs and the like. Items of interest can be items that are available for purchase via, for example, an online merchant that one or more users may have an interest in buying. According to some embodiments, a user profile may include information about a user, such as but not limited to one or more of purchasing history, loyalty program information, demographic information, social media information, internet browsing information, items or other content that the user may be interested in, and information regarding the user's engagement with presented items and content in relation to the associated emotional categories of the items, the emotional state of the user and/or the style of visual presentation of an associated digital media clip or item of interest. According to some embodiments, content interaction server 410 may use a user profile to determine which items of interest and which digital media clips to present to the user, as well as which visual presentation style to use in presenting the content. In some embodiments, following each new instance of presentation of an item of interest to the user, the content interaction server 410 can update the user profile to reflect the impact that the type of item, the type of digital media clip, the type of presentation style, the type of emotion associated with the item/digital media clip, and/or the emotional state of the user at the time of presentation of the item of interest had on whether the user engaged with (e.g., clicked on) the presented item of interest or not. In this way, the content interaction server 410 can maintain and continually refine an engagement model for each user in order to more effectively generate engagement with items of interest presented to the user.

According to some embodiments, the content interaction server 410 can be configured to determine one or more items that a particular user may be interested in, which can be referred to as "items of interest". For example, one user may be interested in items of jewelry, whereas another user may be interested in athletic and gaming equipment. In some embodiments, the content interaction server 410 can determine items of interest for a particular user based on data associated with the user, such as product browsing history, loyalty program information, demographical information, and/or buying patterns associated with the user. For example, content interaction server 410 may receive internet browsing information associated with a user and determine what items or types of items a user has searched for and/or viewed. As will be appreciated by those of skill in the art, such internet browsing information may be obtained from browsers, websites, or other third party software that can track user browsing activity. According to some embodiments, browsing history can be obtained from cookies stored on the user's browser, or an ecommerce website can track and store the shopping history of the user. For example, as will be appreciated by those of skill in the art, various ecommerce web sites provide product search, digital media, and online shopping functionalities and such ecommerce sites may store information reflecting user interactions with these and other such functionalities. According to some embodiments, such internet browsing information may indicate the identification of the user performing the browsing by, for example, detecting a login associated with a browser, website, or a device identification. If browsing is performed by a user that is unidentified, content interaction server 410 may utilize one or more unidentified user profiles/models in determining which content to present to the user. In some embodiments, content interaction server 410 may identify items of interest for a user based on, for example, one or more loyalty programs or merchant accounts. For example, a user may have an account with an online merchant and may maintain a "wish list" of items they are interested in. Accordingly, in some embodiments, content interaction server 410 may receive user information from merchant server 430 that provides indications of items of interest for one or more users. According to some embodiments, content interaction server 410 may determine one or more items of interest based on demographic information, such as for example, age, location, income and the like. For example, if a user lives near the coast, content interaction server 410 may determine that the user may have interest in items relating to oceanic or watersports activities. Furthermore, in some embodiments, the content interaction server 410 may receive past purchase information associated with a user (e.g., from merchant server 430) and may determine items of interest based on a buying pattern associated with the user. For example, if the user frequently buys new clothes after purchasing airline tickets, the content interaction server 410 may determine that the user may have an interest in purchasing clothes after determining that an airline ticket has recently been purchased. It should be appreciated that these are merely examples, and that the content interaction server 410 may utilize many other techniques of determining items of interest associated with a user.

According to some embodiments, the content interaction server 410 may tag or associate each item of interest (or other content) with one or more emotions that are expected to increase user engagement with the item or other content. For example, an airline ticket to a tourist destination may be associated with excitement, curiosity, and/or love, whereas a piece of fitness equipment may be associated with aggression, energetic feelings, and/or health-consciousness. In some embodiments, content interaction server 410 may determine that an emotion is expected to increase user engagement with an item based on past successes. For example, in some embodiments, the content interaction server 410 may initially associated items with one or more randomly selected emotions, observe which emotions result in positive user engagements with the items across a plurality of users of the system, and then update the emotion(s) associated with an item by selecting the emotion(s) associated with the highest rate of successful user engagement with the item. According to some embodiments, one or more emotions may be manually associated with an item. For example, in some embodiments, a merchant may specify one or more emotions associated with a given item.

Similarly, the content interaction server 410 may also be configured to tag or associate one or more emotions with each of a plurality of digital media clips. For example, a scene from a romantic comedy may be associated with humor and/or love, whereas a scene from an action movie may be associated with aggression and/or fear. According to some embodiments, content interaction server 410 may determine one or more emotions to associate with a movie clip by performing a natural language analysis of written content associated with the clip or the source of the clip. Content interaction server 410 may include software that provides a natural language processing capability that, as will be understood of those of skill in the art, can allow content interaction server 410 to determine a meaning associated with various textual phrases or statements. For example, in some embodiments, content interaction server 410 may perform a natural language processing analysis on comments associated with the clip in a case where the clip is available for viewing on the internet to determine an emotion to associate with the clip. For example, a comment associated with a clip may read "That was so scary!", in which case the content interaction server 410 may determine an emotion of fear shall be associated with the clip. In some embodiments, the content interaction server 410 may associate one or more emotions with a digital media clip based on one or more user inputs. For example, in some embodiments, a plurality of users may view a plurality of social media clips and may input one or more emotions they felt while watching each clip. According to some embodiments, the content interaction server 410 may update or change the one or more emotions associated with a digital media clip based on the level of successful user engagement generated by the clip in association with an emotion. For example, in some embodiments content interaction server 410 may associate a clip with a first emotion, utilize the clip in association with a threshold number of presentations of items of interest to users, and then determine an engagement rate of the interactions (e.g., what percentage of the time the user decided to interact with the item of interest in association with the presented clip based on the first emotion). If the engagement rate is below a predetermined threshold, the content interaction server 410 may replace the first emotion with a second emotion and repeat the process until, for example, the engagement rate exceeds a predetermined threshold or a number of different emotions have been tested in which case the content interaction server 410 may select the emotion that is associated with the highest engagement rate. According to some embodiments, the content interaction server 410 can also apply this approach to determining the optimal emotion(s) to associate with each item of interest.

According to exemplary embodiments, content interaction server 410 can be configured to monitor a user's online browsing activity in order to determine when to present a media clip and an item of interest. For example, browsing activity may be monitored view software downloaded to a user device 420, incorporated into a browser used by the user, monitored on the server-side by for example merchant server 430, or any other suitable way of monitoring internet browsing activity. In some embodiments, content interaction server 410 may be configured to determine, based on the monitoring of a user's internet browsing activity, an internet browsing action performed by the user that may serve as a trigger for presenting a selected digital media clip and a selected item of interest to the user. For example, an internet browsing action may include, but is not limited to, performing a search on a search engine, visiting a particular website, adding an item to an online shopping cart, watching a digital video, logging in to an online account, exiting a website, closing a browser, running an application, such as an advertisement-based application or game, pausing a navigational activity (e.g., ceasing to scroll through a website, pausing a video, ceasing to interact with a browser) for a threshold amount of time or any other such type of internet browsing activity that may serve as a trigger for presenting content to a user. According to some embodiments, content interaction server 410 may cause user device 420 to display a selected digital media clip and a selected item of interest in response to detecting such an internet browsing activity. For example, software downloaded onto a user device 420 or integrated into a browser being run on user device 420 may communicate with content interaction server 410 to allow content interaction server 410 to cause the user device 420 to display the digital media clip and item of interest. According to some embodiments, content interaction server 410 may display a selected digital media clip and item of interest based on a user's determined emotional state as described in further detail below, in addition to detecting an internet browsing action performed by the user.

Content interaction server 410 can be configured to select a display method that may include one or more of a pop-up window, display in a margin of a browser, auto-navigating a browser window to website containing the digital media clip and item of interest, displaying the digital media clip in a thumbnail window within the browser, or integrated the digital media clip and/or item of interest into the results of a search query. According to some embodiments, the digital media clip and the item of interest may be displayed sequentially. For example, content interaction server 410 may cause a browser on user device 420 to display a movie clip followed by a selectable advertisement. In some embodiments, content interaction sever 410 may cause a selected digital media clip and a selected item of interest to be displayed simultaneously. For example, a browser may display a media clip in a central portion of the browser window while displaying an advertisement for the item of interest in a margin of the browser window. The display method may be selected based on the user profile associated with the user, which can indicate the display methods that have historically resulted in the highest engagement rates for the user. In some embodiments, a display method may be selected based on which display methods have historically resulted in the highest engagement rates across all or a subset of all users in relation to the type of content being presented. According to some embodiments, content interaction server 410 can select a display method based on a determined emotional state of the user. As will be appreciated, in various embodiments, content interaction server 410 may select a display method based on various different metrics, with the end goal of maximizing the engagement rate of the user with the displayed item of interest, and the previous example are not intended to be limiting in any way.

According to some embodiments, content interaction server 410 may select an item of interest to present to the user that is one of a plurality of items of interest that have been previously identified by the system as being potentially of interest to the user (e.g., as recorded in an associated user profile). In some embodiments, the content interaction server 410 may select a digital media clip to present in association with the item of interest based on the emotion tags associated with each. In some embodiments, the content interaction server 410 may select a digital media clip that is associated with the same emotion as that associated with the item of interest. For example, if the item of interest is associated with romance, the content interaction server 410 may select a digital media clip that is also associated with romance. According to some embodiments, content interaction server may select a digital media clip for presentation with an item of interest based on the user engagement rates associated with a plurality of digital media clips being associated with the same emotion as the item of interest. For example, content interaction server 410 may select the digital media clip having the highest user engagement rate across all users. In some embodiments, the content interaction server 410 may base the decision on the frequency or number of times a particular digital media clip has been presented to the user to, for example, eliminate clips that have been presented too frequently or too recently to the user. According to some embodiments, the item of interest selected for presentation to the user may be based on the browsing activity of the user. For example, if the user is performing searches for fitness equipment, the content interaction server 410 may select a piece of fitness equipment to present to the user in association with a selected digital media clip. According to some embodiments, content interaction server 410 may select an item of interest to present to a user based on a determined emotional state of the user. In some embodiments, content interaction server 410 may choose an item of interest associated with an emotion that is the same as the determined emotion of the user. For example, if the content interaction server 410 determines that the user is angry or aggressive, the content interaction server may select a piece of fitness equipment to present to the user. In some embodiments, content interaction server 410 may select an item of interest associated with an emotion that is complementary or opposite to as the determined emotion of the user. For example, if the user is determined to be sad, content interaction server 410 may select an item of interest that is associated with humor, such as tickets to a comedy. The nature of the item or emotion that is selected may be based on the user model, which can indicate what has been successful or has failed in generating user engagement in the past. In this way, the system can personalize the types of items and content presented to a user to reflect the user's personality and what the user is most likely to engage with. As will be appreciated by those of skill in the art, user models/profiles can be updated and refined using machine learning techniques in response to detecting that a user has engaged with or decided not to engage with a given item of interest that has been displayed in association with a given digital media clip. Over time, the application of machine learning to previous engagement results can determine what types of items, digital media clips, presentation styles, and emotional associations are likely to result in user engagement with presented items of interest, optionally based on the user's determined emotional state.

According to exemplary embodiments, the content interaction server 410 can be configured to determine a user's emotional state in response to analyzing data associated with the user. For example, content interaction server 410 can communicate with a social network server 440 to receive social media information associated with the user, such as posts, comments, and status updates. As will be appreciated by those of skill in the art, content interaction server 410 may apply natural language processing techniques to such social media information to determine the meaning of the posts, comments and/or status updates and derive the user's emotional state. According to some embodiments, user device 420 may include software that can provide an indication of a user's emotional status in response to, for example, performing a similar natural language processing analysis on text messages, emails, or other digital communications from the user that are stored on user device 420. According to some embodiments, content interaction server 410 may receive sensor data from one or more user devices 420 that can be used to determine a user's emotional status. For example, content interaction server 410 may receive audio data from a microphone of user device 420 or image data from a camera of user device 420. As will be appreciated by those of skill in the art, content interaction server 410 may include software for performing voice-to-text conversion of audio data into text that may be analyzed for indications of emotional state using natural language processing. Content interaction server 410 may include image analysis software that may be configured to identify a facial expression of a user, which may be used to determine an emotional state of the user.

As mentioned previously, an item of interest may be displayed by user device 420 as part of an advertisement. In some embodiments, an advertisement may be provided by merchant server 430. According to some embodiments, an advertisement displaying an item of interest may be selectable or interactive to, for example, facilitate a purchase of the item. For example, in response to being selected by a user of user device 420, a selectable advertisement may cause a browser of user device 420 to automatically connect to merchant server 430 and load a web site that provides the user with the opportunity to execute a purchase of the item of interest.

The configuration of system 400 shown in FIG. 4 is intended to be exemplary and not limiting. Although FIG. 4 depicts content interaction server 410, merchant server 430 and social network server 440 as separate devices, in various embodiments these devices may be combined into one or two devices. For example, in some embodiments, some or all of functionality of the content interaction server 410 may be executed by a merchant or by a social network.

In exemplary embodiments, user devices 420 can include, but are not limited to, a smartphone, a wearable device such as a smartwatch, an augmented reality headset, a tablet, a computer system such as the one shown in FIG. 3, a smart speaker, a television, or any other suitable electronic device. User devices 420 include a processor 422, one or more sensors 424, a display 426 and a transceiver 428. The sensors 424 can include one or more of an image capture device (e.g., digital camera) for obtaining images and/or videos, a microphone for obtaining audio recordings, and a location sensor for obtaining location data of the user device (e.g., GPS coordinates). User devices 420 can include an input device, such as a keyboard (either physical or digital) for receiving user input text. Text can also be input orally via a microphone using voice recognition. In some embodiments, display 426 is configured to display images and/or video. In some embodiments, display 426 can be a touchscreen that may be configured to detect tactile user inputs (e.g., typing, pressing, swiping, etc.). Transceiver 428 can be configured to allow a user device 420 to communicate with other devices via communications network 415 (e.g., via Wi-Fi, cellular communications, etc.). User devices 420 may include one or more internet browsers or other software for viewing websites. According to some embodiments, a user device 420 may include software that allows tracking of a user's internet browsing history or activity, which may be communicated to content interaction server 410.

Figure 5:
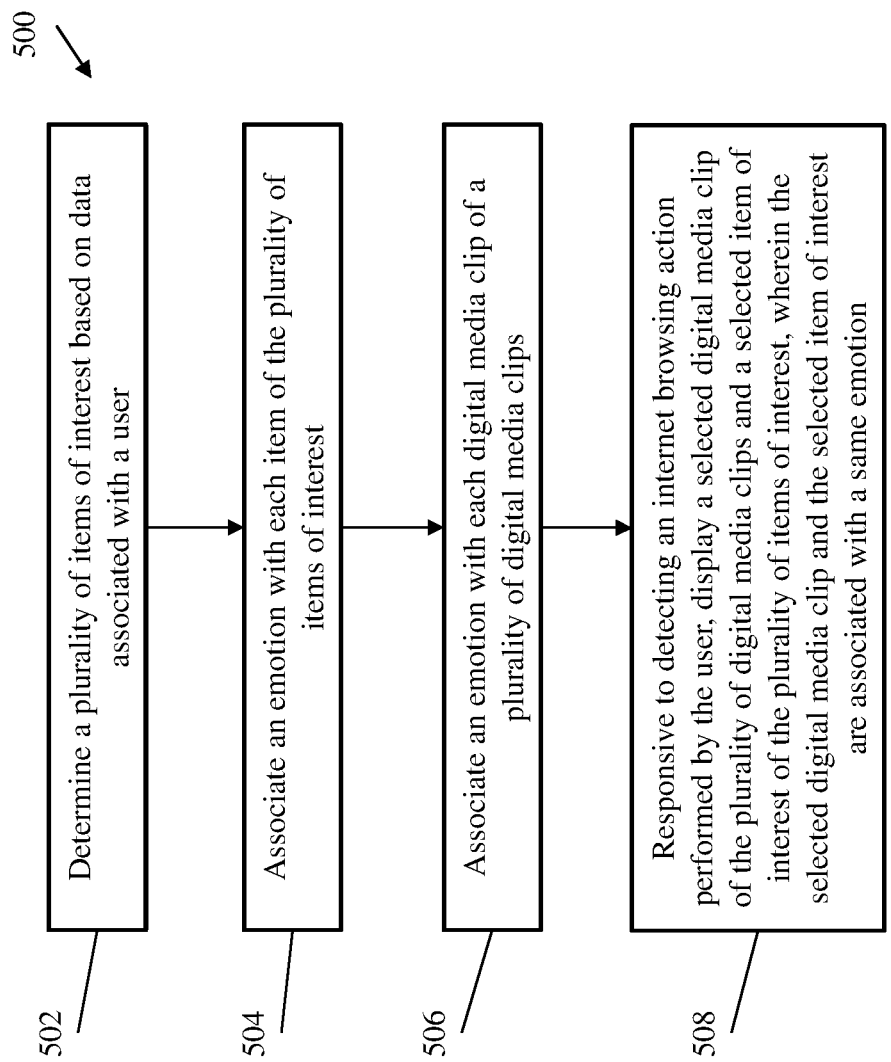
FIG. 5 depicts a flow diagram of a method for prompting web-based user interaction according to one or more embodiments of the invention.

Turning now to FIG. 5, a flow diagram of a method 500 for prompting web-based user interaction in accordance with an embodiment is shown. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 500 begins at block 502 and includes determining (e.g., via content interaction server 410) a plurality of items of interest based on data associated with a user. As previously described above, the data associated with the user can include at least one of product browsing history, loyalty program information and a buying pattern associated with the user.

As shown at block 504, the method includes associating (e.g., via content interaction server 410) an emotion with each item of the plurality of items of interest, for example, in a manner as described above with respect to content interaction server 410. As shown at block 506, the method includes associating (e.g., via content interaction server 410) an emotion with each digital media clip of a plurality of digital media clips, for example, in a manner as described above with respect to content interaction server 410.

As shown at block 508, in response to detecting an internet browsing action performed by the user, the method includes displaying a selected digital media clip of the plurality of digital media clips and a selected item of interest of the plurality of items of interest. For example, as describe previously above, content interaction server 410 may detect an internet browsing action performed by the user and cause user device 420 to display the selected digital media clip (e.g., in a form of a video that automatically plays) and the selected item of interest (e.g., in the form of an advertisement). According to some embodiments, the selected digital media clip and the selected item of interest may be associated with a same emotion. For example, if the item of interest selected by the content interaction server 410 is associated with excitement, then content interaction server 410 may select a digital media clip that is also associated with excitement. According to some embodiments, displaying the selected item of interest can include displaying a selectable advertisement for purchase of the selected item of interest. In some embodiments, the selected digital media clip can be displayed sequentially prior to the display of the selectable advertisement for purchase of the selected item of interest. For example, user device 420 may display a video clip of the media content and then present an advertisement for the item of interest at the end of the video clip. In some embodiments, the selected digital media clip is displayed simultaneously to the display of the selectable advertisement for purchase of the selected item of interest. For example, a browser of user device 420 may display the digital media clip in a central portion of the browser window while simultaneously displaying a selectable advertisement in a margin of the browser window. According to some embodiments, the internet browsing action can include but are not limited to one of performing a search on a search engine, visiting a website, pausing the scrolling of a website for a threshold period of time, running an application, such as an advertisement-based application or game, and any other such function or action that may be executed by a website, browser or initiated by a user input.

In some embodiments, the method may further include determining an emotional state of the user and selecting the selected digital media clip and the selected item of interest based on the determined emotional state of the user. For example, if the user is determined to be feeling relaxed, the content interaction server 410 may select an item of interest and a digital media clip that are both associated with relaxation. According to some embodiments, the emotional state of the user can be determined by at least one of: the user's social media content, electronic communications and information derived from user device 420 sensors, as previously described above.

In some embodiments, the method may further include selecting the item of interest based on the internet browsing action performed by the user, creating a set of media clips comprising a subset of the plurality of media clips; each media clip of the set of media clips being associated with the same emotion, ranking the set of media clips based on successful engagement rates in relation to the selected item of interest and selecting a highest ranked media clip of the ranked set of media clips as the selected media clip. In other words, the content interaction server 410 may identify a subset of the plurality of digital media clips that may be appropriate to show in association with the selected item of interest (e.g., they have the same emotion tags as the item of interest), and then may select the digital media clip that has the highest chance of generating a user engagement with the item of interest, based on the previous engagement rates associated with the clips. In engagement rate can represent the percentage of time a user has chosen to select an advertisement associated with an item of interest in relation to each aspect of the presentation (i.e., in relation to the selected digital media clip, in relation to the style of presentation of the content, in relation to the emotion tags, etc.). In some embodiments, the method may include increasing the engagement rate of the selected media clip in response to determining that the user has selected the selectable advertisement or decreasing the engagement rate of the selected media clip in response to determining that the user has opted not to select the selectable advertisement. In other words, based on whether or not the user has engaged with the item of interest presented in association with the presented media clip, the content interaction server 410 may update the stored engagement rate associated with the digital media clip positively or negatively. According to some embodiments, content interaction server may determine that a user has engaged with a presented item of interest in response to determining that the user has for example, clicked on the presented item of interest or performed a search for the item of interest within a threshold amount of time of presenting the item of interest. According to some embodiments, the content interaction server 410 may determine that the user has decided not to engage with the item of interest in response to determining for example, that the user has not clicked on or performed a search for the item of interest within a threshold period of time, has navigated to a different website or has closed the internet browser following presentation of the item of interest.

Figure 6:
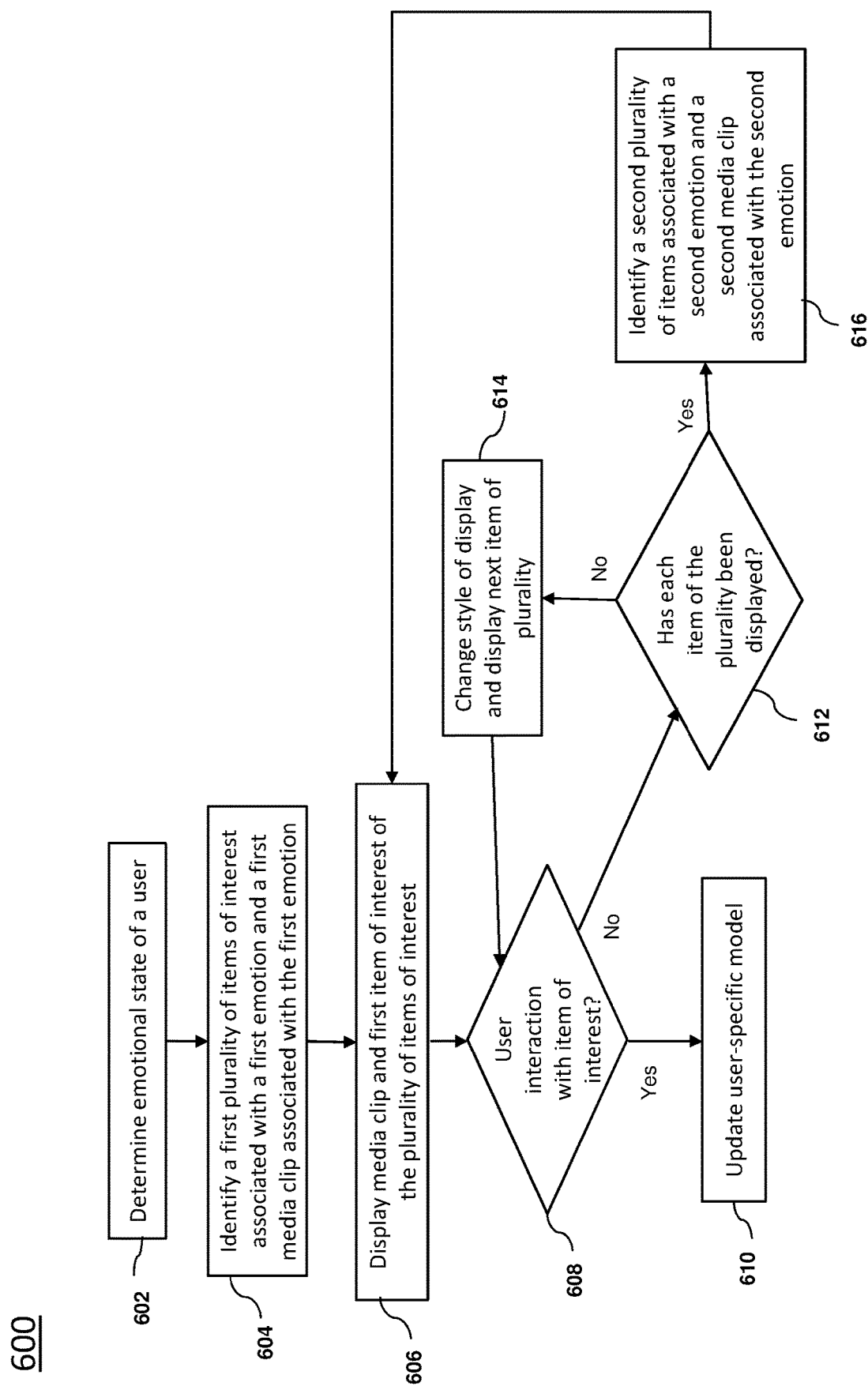
FIG. 6 depicts a flow diagram of a method for improving the effectiveness of web-based user interaction prompts according to one or more embodiments of the invention.

FIG. 6 depicts a flow diagram of a method for improving the effectiveness of web-based user interaction prompts according to one or more embodiments of the invention. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes determining an emotional state of the user, for example in a manner similar to that described previously above. As shown in block 604, the method 600 includes identifying a first plurality of items of interest associated with a first emotion and a first media clip associated with the first emotion. As shown in block 606, the method 600 includes displaying a digital media clip and the first item of interest of the plurality of items of interest. As shown in block 608, the method 600 includes determining whether the user has interacted with or engaged the item of interest. For example, the system may determine whether the user has clicked on advertisement or link associated with the item of interest. If the system determines that the user has interacted with the item of interest, the method may proceed to block 610 where the system may update a user-specific model to reflect the successful user interaction based on the displayed media clip and the associated emotion. For example, the system may adjust the engagement rates associated with the digital media clip, the item of interest, the emotional state of the user, the style of display and/or the emotion tags associated with the item of interest and/or the digital media clip to reflect the fact that the selected digital media clip and selected item of interest presented in the selected style of display resulted in a positive user engagement with the item of interest. If the system determines that the user has opted not to interact with the item of interest, for example in a manner similar to that discussed previously above, then the method may proceed to block 612. The system may also update the user-specific model to reflect the fact that the user failed to engage with the item of interest by, for example, adjusting engagement rates with various aspects downwards.

At block 612, the method 600 includes determining whether each item of the plurality of items has been displayed. If not, the method proceeds to block 614, where the method includes changing the style of display and displaying the next item of the plurality of items before proceeding back to block 608. For example, as discussed previously above, different styles of display can include presenting clips and items sequentially or simultaneously, presenting content in a pop-up window, in the margin of a browser window, embedded as results to a search query and the like. By varying the style of display, the system may determine if a particular style is more likely to result in a user engagement with the presented item of interest. If the system determines that all of the items of the plurality of items have been displayed and that the user did not interact or engage with any of them, the method can proceed to block 616, where the method includes identifying a second plurality of items associated with a second emotion and a second media clip associated with the second emotion. Thus, after having failed to generate an engagement with an item of interest using the first emotion, the system may test a second emotion to determine if the user may find presentation of material associated with the second emotion to provide more of a motivation to engage with an item of interest. The method can proceed from block 616 back to block 606, where the method includes displaying the media clip and the first item of interest of the plurality of items of interest as previously described above, and the method may iterate in this manner. The method shown in FIG. 6 is merely exemplary, and it should be understood that various embodiments may utilize variations of this method that are designed to test one or more selected aspects (i.e., selected digital media clips, items of interest, display styles or emotion tags) for effectiveness in generating user-engagement with respect to a particular user.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, based on data associated with a user, a plurality of items of interest;
   associating an emotion with each item of the plurality of items of interest;
   associating an emotion with each digital media clip of a plurality of digital media clips;
   responsive to detecting an internet browsing action performed by the user, determining an emotion of the user, and selecting a selectable advertisement for each of the plurality of items of interest;
   selecting, by the processor, a digital media clip assigned to the determined emotion of the user and configured to prompt the user to engage the selectable advertisement, wherein selecting the digital media clip includes selecting a subset of the plurality of digital media clips, each digital media clip of the subset being associated with the determined emotion of the user;

displaying, by the processor, the selected digital media clip of the plurality of digital media clips and a selected item of interest of the plurality of items of interest, wherein the selected digital media clip and the selected item of interest are associated with the determined emotion, wherein the selected digital media clip and the selected item of interest are displayed to the user according to a style of visual presentation selected based on the determined emotion;

determining whether the user has interacted with the selected item of interest;

based on determining that the user has not interacted with the selected item of interest, modifying the style of visual presentation and displaying another item of interest from the plurality of items of interest according to the modified style of visual presentation; and based on determining that the user has interacted with the another item of interest, updating a model of the user to indicate that the modified style of visual presentation is likely to result in user engagement with a subsequent item of interest.

2. The computer-implemented method of claim 1, wherein the data associated with the user comprises at least one of product browsing history, loyalty program information and a buying pattern associated with the user.

3. The computer-implemented method of claim 1, wherein associating an emotion with a digital media clip includes associating the digital media clip with a first emotion, determining an engagement rate of a plurality of previous presentations of the digital media clip associated with the first emotion, and based on the engagement rate being above a threshold, assigning the first emotion to the digital media clip.

4. The computer-implemented method of claim 3, wherein the selected digital media clip is displayed sequentially prior to the display of the selectable advertisement for purchase of the selected item of interest.

5. The computer-implemented method of claim 3, wherein the selected digital media clip is displayed simultaneously to the display of the selectable advertisement for purchase of the selected item of interest.

6. The computer-implemented method of claim 3, wherein associating an emotion with a digital media clip includes, based on the engagement rate being below a threshold, associating the digital media clip with a second emotion different than the first emotion.

7. The computer-implemented method of claim 1, wherein the internet browsing action comprises one of performing a search on a search engine, visiting a web site, pausing scrolling of a web site for a threshold period of time and running an advertisement-based application or game.

8. The computer-implemented method of claim 1 further comprising:
determining an emotional state of the user; and
selecting the selected digital media clip and the selected item of interest based on the determined emotional state of the user.

9. The computer-implemented method of claim 8 wherein the emotional state of the user is determined by at least one of: the user's social media content, electronic communications and information derived from device sensors.

10. The computer-implemented method of claim 1, further comprising:
responsive to determining that the user has selected the selectable advertisement, increasing an engagement rate of the selected digital media clip; or
responsive to determining that the user has opted not to select the selectable advertisement, decreasing the engagement rate of the selected digital media clip.

11. A system comprising:
a processor communicatively coupled to a memory, the processor configured to:
determine, based on data associated with a user, a plurality of items of interest;
associate an emotion with each item of the plurality of items of interest;
associate an emotion with each digital media clip of a plurality of digital media clips;
responsive to detecting an internet browsing action performed by the user, determine an emotion of the user, and select a selectable advertisement for each of the plurality of items of interest;
select a digital media clip assigned to the determined emotion of the user and configured to prompt the user to engage the selectable advertisement, wherein selecting the digital media clip includes selecting a subset of the plurality of digital media clips, each digital media clip of the subset being associated with the determined emotion of the user;
display the selected digital media clip of the plurality of digital media clips and a selected item of interest of the plurality of items of interest, wherein the selected digital media clip and the selected item of interest are associated with the determined emotion, wherein the selected digital media clip and the selected item of interest are displayed to the user according to a method of visual presentation selected based on the determined emotion;
determine whether the user has interacted with the selected item of interest;
based on determining that the user has not interacted with the selected item of interest, modify the style of visual presentation and display another item of interest from the plurality of items of interest according to the modified style of visual presentation; and
based on determining that the user has interacted with the another item of interest, updating a model of the user to indicate that the modified style of visual presentation is likely to result in user engagement with a subsequent item of interest.

12. The system of claim 11, wherein the data associated with the user comprises at least one of product browsing history, loyalty program information and a buying pattern associated with the user.

13. The system of claim 11, wherein associating an emotion with a digital media clip includes associating the digital media clip with a first emotion, determining an engagement rate of a plurality of previous presentations of the digital media clip associated with the first emotion, and based on the engagement rate being above a threshold, assigning the first emotion to the digital media clip.

14. The system of claim 13, wherein the selected digital media clip is displayed sequentially prior to the display of the selectable advertisement for purchase of the selected item of interest.

15. The system of claim 13, wherein the selected digital media clip is displayed simultaneously to the display of the selectable advertisement for purchase of the selected item of interest.

16. The system of claim 11, wherein the internet browsing action comprises one of performing a search on a search engine, visiting a web site, pausing scrolling of a website for a threshold period of time and running an advertisement-based application or game.

17. A computer program product comprising a non-transitory computer readable storage medium having program instructions embodied therewith the program instructions executable by a computer processor to cause the computer processor to perform a method comprising:
- determining, based on data associated with a user, a plurality of items of interest;
- associating an emotion with each item of the plurality of items of interest;
- associating an emotion with each digital media clip of a plurality of digital media clips;
- responsive to detecting an internet browsing action performed by the user, determining an emotion of the user, and selecting a selectable advertisement for each of the plurality of items of interest;
- selecting, by the processor, a digital media clip assigned to the determined emotion of the user and configured to prompt the user to engage the selectable advertisement, wherein selecting the digital media clip includes selecting a subset of the plurality of digital media clips, each digital media clip of the subset being associated with the determined emotion of the user;
- displaying by the processor, the selected digital media clip of the plurality of digital media clips and a selected item of interest of the plurality of items of interest, wherein the selected digital media clip and the selected item of interest are associated with the determined emotion, wherein the selected digital media clip and the selected item of interest are displayed to the user according to a method of visual presentation selected based on the determined emotion;
- determining whether the user has interacted with the selected item of interest;
- based on determining that the user has not interacted with the selected item of interest, modifying the style of visual presentation and displaying another item of interest from the plurality of items of interest according to the modified style of visual presentation; and
- based on determining that the user has interacted with the another item of interest, updating a model of the user to indicate that the modified style of visual presentation is likely to result in user engagement with a subsequent item of interest.

18. The computer program product of claim 17, wherein the data associated with the user comprises at least one of product browsing history, loyalty program information and a buying pattern associated with the user.

19. The computer program product of claim 17, wherein associating an emotion with a digital media clip includes associating the digital media clip with a first emotion, determining an engagement rate of a plurality of previous presentations of the digital media clip associated with the first emotion, and based on the engagement rate being above a threshold, assigning the first emotion to the digital media clip.

20. The computer program product of claim 19, wherein the selected digital media clip is displayed sequentially prior to the display of the selectable advertisement for purchase of the selected item of interest.

* * * * *